(12) United States Patent
Goto et al.

(10) Patent No.: US 10,101,511 B2
(45) Date of Patent: Oct. 16, 2018

(54) POLARIZER, POLARIZING PLATE, AND IMAGE DISPLAY APPARATUS

(71) Applicant: NITTO DENKO CORPORATION, Ibaraki-shi, Osaka (JP)

(72) Inventors: Shusaku Goto, Ibaraki (JP); Daisuke Ogomi, Ibaraki (JP); Masahiro Yaegashi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 15/042,599

(22) Filed: Feb. 12, 2016

(65) Prior Publication Data

US 2016/0238770 A1 Aug. 18, 2016

(30) Foreign Application Priority Data

Feb. 16, 2015 (JP) ................................ 2015-027660

(51) Int. Cl.
*G02B 5/30* (2006.01)
*G02B 27/28* (2006.01)

(52) U.S. Cl.
CPC ................. *G02B 5/3033* (2013.01)

(58) Field of Classification Search
CPC .. G02B 5/3083; G02B 5/3016; G02B 5/3058; G02B 27/286; G02F 1/133528; G02F 1/13363; G02F 1/133514; G02F 1/134309
See application file for complete search history.

(56) References Cited

U.S. PATENT DOCUMENTS

| | | | |
|---|---|---|---|
| 4,181,756 A | 1/1980 | Fergason | |
| 4,396,646 A * | 8/1983 | Schuler | G02B 5/3033 264/1.34 |
| 4,466,704 A | 8/1984 | Schuler et al. | |
| 7,582,857 B2 * | 9/2009 | Gruev | G01J 4/04 250/225 |
| 8,031,296 B2 | 10/2011 | Maezawa et al. | |
| 8,314,987 B2 | 11/2012 | Goto et al. | |
| 8,320,042 B2 | 11/2012 | Goto et al. | |
| 8,379,169 B2 | 2/2013 | Kitagawa et al. | |
| 8,411,360 B2 | 4/2013 | Kitagawa et al. | |
| 8,467,177 B2 | 6/2013 | Mathew et al. | |
| 8,520,169 B2 | 8/2013 | Kitagawa et al. | |

(Continued)

FOREIGN PATENT DOCUMENTS

CN 101137917 A 3/2008
CN 103080790 A 5/2013
(Continued)

OTHER PUBLICATIONS

Office Action dated May 26, 2016, issued in Korean Application No. 2015-0185893, with English translation (15 pages).
(Continued)

*Primary Examiner* — William R Alexander
*Assistant Examiner* — Tamara Y Washington
(74) *Attorney, Agent, or Firm* — Westerman, Hattori, Daniels & Adrian, LLP

(57) ABSTRACT

A polarizer according to an embodiment of the present invention includes a resin film having a thickness of 13 μm or less and containing iodine. The resin film has formed therein a low-concentration portion having a content of the iodine lower than that of another portion.

15 Claims, 2 Drawing Sheets

(56) References Cited

U.S. PATENT DOCUMENTS

| | | |
|---|---|---|
| 8,520,171 B2 | 8/2013 | Kitagawa et al. |
| 8,709,567 B2 | 4/2014 | Kitagawa et al. |
| 8,721,816 B2 | 5/2014 | Kitagawa et al. |
| 8,771,454 B2 | 7/2014 | Goto et al. |
| 8,852,374 B2 | 10/2014 | Goto et al. |
| 8,917,376 B2 | 12/2014 | Yoshimi |
| 9,023,168 B2 | 5/2015 | Kitagawa et al. |
| 9,069,137 B2 | 6/2015 | Bae et al. |
| 9,158,051 B2 * | 10/2015 | Nam ............... G02B 5/3033 |
| 9,177,983 B2 * | 11/2015 | Kuang ............ H01L 27/14621 |
| 9,227,222 B2 | 1/2016 | Izaki et al. |
| 9,283,740 B2 | 3/2016 | Kitagawa et al. |
| 9,291,744 B2 | 3/2016 | Sawada et al. |
| 9,329,307 B2 | 5/2016 | Sawada et al. |
| 2004/0212555 A1 | 10/2004 | Falco |
| 2005/0285286 A1 | 12/2005 | Shuto et al. |
| 2007/0035681 A1 | 2/2007 | Okada et al. |
| 2008/0192345 A1 | 8/2008 | Mochizuki et al. |
| 2009/0323185 A1 * | 12/2009 | Goto ............... B29D 11/00634 359/489.2 |
| 2010/0002171 A1 | 1/2010 | Yoshimi |
| 2010/0085641 A1 | 4/2010 | Saiki et al. |
| 2010/0182546 A1 | 7/2010 | Maezawa et al. |
| 2010/0245727 A1 | 9/2010 | Shigetomi et al. |
| 2011/0128412 A1 * | 6/2011 | Milnes ................ G02B 27/22 348/231.99 |
| 2011/0148839 A1 * | 6/2011 | Hwang ................ G02B 5/205 345/211 |
| 2011/0163281 A1 | 7/2011 | Bae et al. |
| 2012/0052197 A1 | 3/2012 | Sawada et al. |
| 2012/0055607 A1 | 3/2012 | Kitagawa et al. |
| 2012/0055608 A1 | 3/2012 | Kitagawa et al. |
| 2012/0055621 A1 | 3/2012 | Goto et al. |
| 2012/0055622 A1 | 3/2012 | Kitagawa et al. |
| 2012/0055623 A1 | 3/2012 | Kitagawa et al. |
| 2012/0056211 A1 | 3/2012 | Kitagawa et al. |
| 2012/0056340 A1 | 3/2012 | Kitagawa et al. |
| 2012/0057104 A1 | 3/2012 | Kitagawa et al. |
| 2012/0057107 A1 | 3/2012 | Kitagawa et al. |
| 2012/0057231 A1 | 3/2012 | Goto et al. |
| 2012/0057232 A1 | 3/2012 | Goto et al. |
| 2012/0058291 A1 | 3/2012 | Kitagawa et al. |
| 2012/0058321 A1 | 3/2012 | Goto et al. |
| 2012/0106063 A1 | 5/2012 | Mathew et al. |
| 2012/0206641 A1 | 8/2012 | Baba |
| 2012/0243089 A1 | 9/2012 | Araki et al. |
| 2012/0320318 A1 | 12/2012 | Sato et al. |
| 2012/0327512 A1 * | 12/2012 | Goto ............... G02B 5/3033 359/487.02 |
| 2013/0100529 A1 | 4/2013 | Kitagawa et al. |
| 2013/0114137 A1 | 5/2013 | Bae et al. |
| 2013/0114139 A1 | 5/2013 | Kitagawa et al. |
| 2013/0128357 A1 * | 5/2013 | Izaki ................ B29C 55/026 359/487.02 |
| 2013/0141787 A1 | 6/2013 | Kim et al. |
| 2013/0229602 A1 | 9/2013 | Yoshimi |
| 2013/0265708 A1 | 10/2013 | Mathew et al. |
| 2014/0016198 A1 | 1/2014 | Sawada et al. |
| 2014/0044947 A1 | 2/2014 | Sawada et al. |
| 2014/0186568 A1 | 7/2014 | Kitagawa et al. |
| 2015/0131151 A1 * | 5/2015 | Goto ................. G02B 1/04 359/487.01 |
| 2015/0132561 A1 | 5/2015 | Goto et al. |
| 2015/0183199 A1 | 7/2015 | Kitagawa et al. |
| 2015/0192720 A1 | 7/2015 | Goto et al. |
| 2015/0219797 A1 * | 8/2015 | Goto ................ G02B 1/111 359/487.02 |
| 2016/0025910 A1 | 1/2016 | Sawada et al. |
| 2016/0047960 A1 * | 2/2016 | Izaki ................ B29C 55/026 359/487.02 |
| 2016/0054494 A1 | 2/2016 | Kitagawa et al. |
| 2016/0103258 A1 | 4/2016 | Kitagawa et al. |
| 2016/0195653 A1 | 7/2016 | Lee et al. |
| 2016/0299271 A1 | 10/2016 | Lee et al. |
| 2016/0299272 A1 | 10/2016 | Lee et al. |
| 2016/0313480 A1 | 10/2016 | Lee et al. |
| 2016/0377777 A1 | 12/2016 | Lee et al. |
| 2017/0003426 A1 * | 1/2017 | Kunai ................ G02B 5/305 |
| 2017/0131448 A1 | 5/2017 | Lee et al. |

FOREIGN PATENT DOCUMENTS

| | | |
|---|---|---|
| CN | 103080792 A | 5/2013 |
| CN | 103091760 A | 5/2013 |
| CN | 103135160 A | 6/2013 |
| CN | 103389535 A | 11/2013 |
| JP | 60-036563 B2 | 8/1985 |
| JP | H06-289224 A | 10/1994 |
| JP | 2000-338329 A | 12/2000 |
| JP | 2001-174638 A | 6/2001 |
| JP | 2002-258051 A | 9/2002 |
| JP | 2002-333523 A | 11/2002 |
| JP | 2005-181818 A | 7/2005 |
| JP | 2007-241314 A | 9/2007 |
| JP | 2007-298958 A | 11/2007 |
| JP | 2008-090216 A | 4/2008 |
| JP | 2008-102246 A | 5/2008 |
| JP | 4339350 B2 | 10/2009 |
| JP | 2011-81315 A | 4/2011 |
| JP | 4838283 B2 | 12/2011 |
| JP | 2012-073582 A | 4/2012 |
| JP | 2012-078780 A | 4/2012 |
| JP | 2012-137738 A | 7/2012 |
| JP | 2013-11837 A | 1/2013 |
| JP | 2013-105036 A | 5/2013 |
| JP | 2013-174786 A | 9/2013 |
| JP | 2013182162 A | 9/2013 |
| JP | 2014-006505 A | 1/2014 |
| JP | 2014-81482 A | 5/2014 |
| JP | 2014-167547 A | 9/2014 |
| JP | 2014-211548 A | 11/2014 |
| JP | 5667016 B2 | 12/2014 |
| JP | 2016-525725 A | 8/2016 |
| JP | 2016-539371 A | 12/2016 |
| JP | 2017-503193 A | 1/2017 |
| KR | 10-0950855 B1 | 3/2010 |
| KR | 10-2010-0087837 A | 8/2010 |
| KR | 10-2010-0125558 A | 12/2010 |
| KR | 10-2011-0110889 A | 10/2011 |
| KR | 10-2012-0123498 A | 11/2012 |
| KR | 10-2013-0050127 A | 5/2013 |
| KR | 2013-0080869 A | 7/2013 |
| KR | 10-2013-0108276 A | 10/2013 |
| KR | 10-2015-0111871 A | 10/2015 |
| TW | 201217148 A | 5/2012 |
| TW | 201343370 A | 11/2013 |
| WO | 2005/029143 A1 | 3/2005 |
| WO | 2015/108261 A1 | 7/2015 |
| WO | 2015/147553 A1 | 10/2015 |
| WO | 2016/003105 A1 | 1/2016 |

OTHER PUBLICATIONS

Report on Prior Art Search (For preferential examination) in Korea, dated Dec. 30, 2015, issued in counterpart Korean Patent Application No. 10-2015-0185893, with English translation. (30 pages).

Office Action dated Jan. 20, 2016, issued in counterpart Korean Patent Application No. 10-2015-0185893, with English translation. (17 pages).

International Search Report dated May 17, 2016, issued in counterpart International Application No. PCT/JP2016/053748. (3 pages).

Explanation of Circumstances Concerning Accelerated Examination dated Jan. 14, 2015, issued in Japanese Patent Application No. 2013-235547, corresponds to U.S. Appl. No. 14/513,380.

Office Action dated Feb. 25, 2015, issued in Japanese Patent Application No. 2013-235547, with Partial English translation, corresponds to U.S. Appl. No. 14/513,380.

Extended European Search Report dated Apr. 13, 2015, issued in European Patent Application No. 14189373.5, corresponds to U.S. Appl. No. 14/513,380.

(56) References Cited

OTHER PUBLICATIONS

Office Action dated Jul. 22, 2015, issued in Japanese Patent Application No. 2013-235547, with English translation, corresponds to U.S. Appl. No. 14/513,380.
Office Action dated Feb. 5, 2016, issued in Korean Patent Application No. 10-2014-0152691, with English translation, corresponds to U.S. Appl. No. 14/513,380.
Office Action dated Jun. 12, 2016, issued in Chinese Patent Application No. 201410638174.0, with English translation, corresponds to U.S. Appl. No. 14/513,380.
Office Action dated Jun. 27, 2016, issued in Taiwanese Application No. 103136127, with English translation, corresponds to U.S. Appl. No. 14/513,380.
Non-Final Office Action dated May 18, 2016, issued in U.S. Appl. No. 14/513,380.
Final Office Action dated Sep. 28, 2016, issued in U.S. Appl. No. 14/513,380.
Non-Final Office Action dated Mar. 17, 2017, issued in U.S. Appl. No. 14/513,380.
Office Action dated Mar. 8, 2017, issued in Japanese Patent Application No. 2015-027660 with English translation.
Notice of Allowance dated May 10, 2017, issued in Japanese Patent Application No. 2015-027660.
Non-Final Office Action dated Mar. 30, 2018, issued in U.S. Appl. No. 14/513,380.

* cited by examiner

FIG. 1
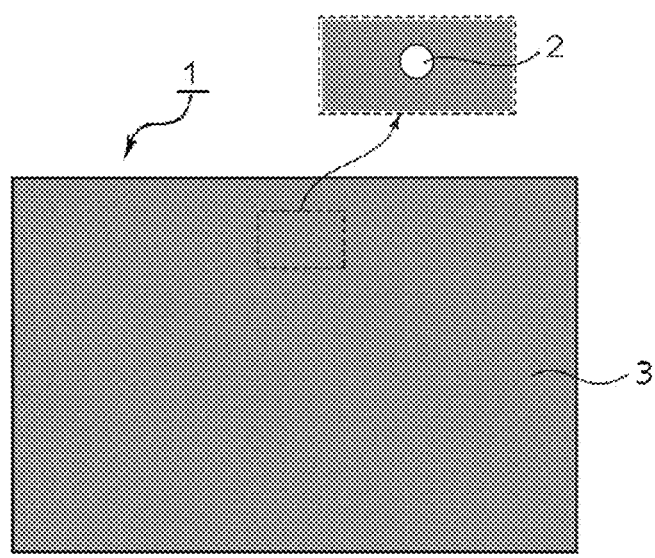
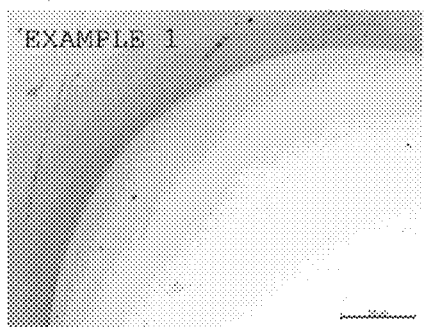
FIG. 2A
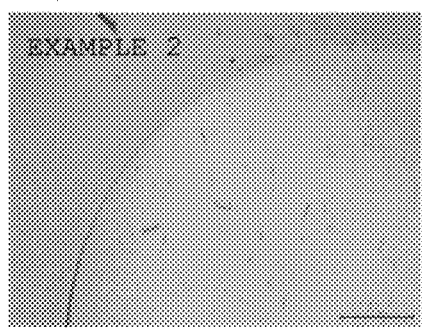
FIG. 2B
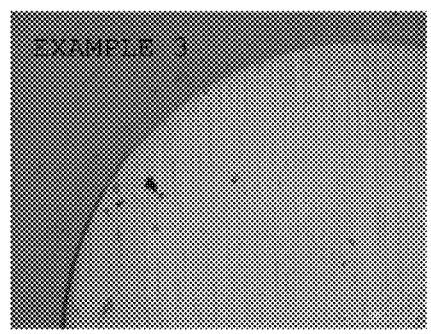
FIG. 2C
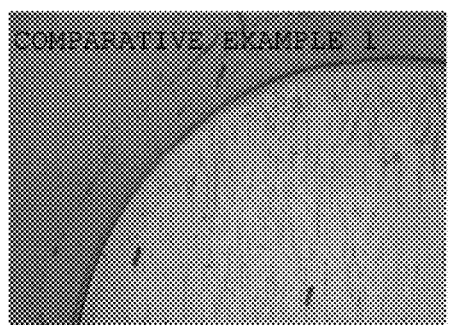
FIG. 2D

POLARIZER, POLARIZING PLATE, AND IMAGE DISPLAY APPARATUS

BACKGROUND OF THE INVENTION

This application claims priority under 35 U.S.C. Section 119 to Japanese Patent Application No. 2015-027660 filed on Feb. 16, 2015, which is herein incorporated by reference.

1. Field of the Invention

The present invention relates to a polarizer, a polarizing plate, and an image display apparatus.

2. Description of the Related Art

Some of the image display apparatus of a cellular phone, a notebook personal computer (PC), and the like have mounted thereon internal electronic parts, such as a camera. Various investigations have been made for the purpose of improving, for example, the camera performance of any such image display apparatus (for example, Japanese Patent Application Laid-open No. 2011-81315, Japanese Patent Application Laid-open No. 2007-241314, US 2004/0212555, and Japanese Patent Application Laid-open No. 2012-137738). However, an additional improvement in camera performance or the like has been desired in association with rapid widespread use of a smart phone and a touch panel-type information processing apparatus. In addition, a polarizer partially having polarization performance has been required in order to correspond to the diversification of the shapes of the image display apparatus and an improvement in functionality thereof.

SUMMARY OF THE INVENTION

The present invention has been made to solve the conventional problems, and a primary object of the present invention is to provide a polarizer that can realize the multi-functionalization of an electronic device, such as an image display apparatus, and an improvement in functionality thereof.

A polarizer according to an embodiment of the present invention includes a resin film having a thickness of 13 μm or less and containing iodine. The resin film has formed therein a low-concentration portion having a content of the iodine lower than that of another portion.

In one embodiment of the present invention, the polarizer has a single axis transmittance of 42.0% or more and a polarization degree of 99.95% or more in the another portion.

In one embodiment of the present invention, the low-concentration portion has a transmittance of 50% or more.

In one embodiment of the present invention, the content of the iodine in the low-concentration portion is 1.0 wt % or less.

In one embodiment of the present invention, the low-concentration portion has a substantially circular shape having a diameter of 10 mm or less.

In one embodiment of the present invention, the thickness of the resin film is 8 μm or less.

In one embodiment of the present invention, the low-concentration portion corresponds to a camera hole portion of an image display apparatus on which the polarizer is mounted.

In one embodiment of the present invention, the low-concentration portion is formed by bringing a basic solution into contact with the resin film containing the iodine.

In one embodiment of the present invention, the basic solution includes an aqueous solution of sodium hydroxide having a concentration of 1 wt % or more.

According to another aspect of the present invention, a polarizing plate is provided. The polarizing plate includes the polarizer.

According to still another aspect of the present invention, an image display apparatus is provided. The image display apparatus includes the polarizing plate.

According to still another aspect of the present invention, a method of producing the polarizer is provided. The method includes bringing a basic solution into contact with a resin film having a thickness of 13 μm or less and containing iodine.

In one embodiment of the present invention, the basic solution has a temperature of 20° C. or more.

In one embodiment of the present invention, the method further includes bringing an acidic solution into contact with a portion of the resin film with which the basic solution has been brought into contact.

In one embodiment of the present invention, the resin film includes a resin layer formed on a substrate.

In one embodiment of the present invention, the resin layer includes an applied layer.

According to the embodiments of the present invention, the polarizer includes the resin film having a thickness of 13 μm or less and containing iodine, and hence the low-concentration portion having an iodine content lower than that of the other portion and excellent in surface smoothness is formed. When the low-concentration portion is caused to correspond to, for example, the camera hole portion of an image display apparatus, the portion can secure the transmission property of the camera hole portion. In addition, the portion can optimize brightness and a tinge at the time of photographing, and prevent the distortion of an image to contribute to an improvement in camera performance of the image display apparatus to be obtained. According to the embodiments of the present invention, there can be provided an image display apparatus securing a transmission property and light straightness not only for the foregoing reception-type electronic device, such as a video monitor (e.g., a camera apparatus having a photographing optical system), but also for an emission-type electronic device, such as a LED light or an infrared sensor, and a naked eye.

BRIEF DESCRIPTION OF THE DRAWINGS

FIG. 1 is a plan view of a polarizer according to one embodiment of the present invention.

FIG. 2A, FIG. 2B, FIG. 2C, and FIG. 2D are photographs obtained by observing the polarizers of Examples and Comparative Example with an optical microscope.

DETAILED DESCRIPTION OF THE PREFERRED EMBODIMENTS

Figure 3A:
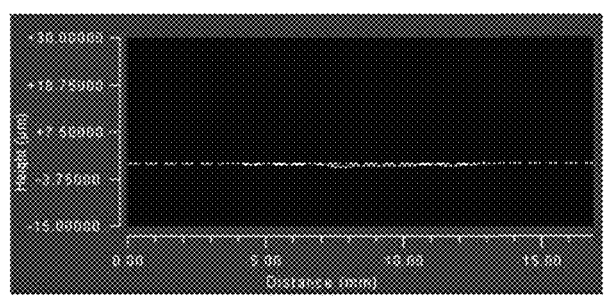
FIG. 3A and FIG. 3B are graphs for showing the results of the evaluations of Example 1 and Comparative Example 1 for surface smoothness.

Embodiments of the present invention are described below. However, the present invention is not limited to these embodiments.

A. Polarizer

FIG. 1 is a plan view of a polarizer according to one embodiment of the present invention. A polarizer 1 includes a resin film containing a dichromatic substance. The polarizer (resin film) 1 has formed therein a low-concentration portion 2 having a relatively low content of the dichromatic substance. Specifically, the polarizer 1 has formed therein the low-concentration portion 2 having a content of the dichromatic substance lower than that of another portion 3. The low-concentration portion can function as a non-polarizing portion. With such construction, a problem in terms of quality, such as cracking, delamination, or adhesive protrusion, is avoided as compared to the case where a through-hole is formed mechanically (e.g., by a method involving mechanically punching out the through-hole in the polarizer through the use of, for example, chisel punching, a plotter, or a water jet). In addition, the low-concentration portion has a low content of the dichromatic substance itself, and hence the transparency of the non-polarizing portion is satisfactorily maintained as compared to the case where the non-polarizing portion is formed by the decomposition of the dichromatic substance with laser light or the like.

In the illustrated example, the low-concentration portion 2 having a small circular shape is formed in the central portion of the upper end portion of the polarizer 1, but the number, arrangement, shapes, sizes, and the like of the low-concentration portions can be appropriately designed. The numbers and the like are designed in accordance with, for example, the position, shape, and size of the camera hole portion of an image display apparatus on which the polarizer is mounted. In this case, the low-concentration portion preferably has a substantially circular shape having a diameter of 10 mm or less.

The transmittance of the low-concentration portion (e.g., a transmittance measured with light having a wavelength of 550 nm at 23° C.) is preferably 50% or more, more preferably 60% or more, still more preferably 75% or more, particularly preferably 90% or more. With such transmittance, desired transparency can be secured. When the low-concentration portion is caused to correspond to, for example, the camera hole portion of an image display apparatus, an adverse effect on the photographing performance of its camera can be prevented.

The polarizer (except the low-concentration portion) preferably exhibits absorption dichroism at any wavelength in the wavelength range of from 380 nm to 780 nm. The polarizer (except the low-concentration portion) has a single axis transmittance of preferably 40.0% or more, more preferably 42.0% or more, still more preferably 42.5% or more, particularly preferably 43.0% or more. The polarizer (except the low-concentration portion) has a polarization degree of preferably 99.8% or more, more preferably 99.9% or more, still more preferably 99.95% or more.

The thickness of the polarizer (resin film) is preferably 13 µm or less, more preferably 8 µm or less, still more preferably 5 µm or less. The adoption of such thickness can result in the formation of a low-concentration portion excellent in surface smoothness while having high transparency. Specifically, the surface roughness (unevenness) of the resin film in the low-concentration portion with reference to the other portion is preferably 3 µm or less, more preferably 1 µm or less. As a result, when the low-concentration portion is caused to correspond to, for example, the camera hole portion of an image display apparatus, an adverse effect on the performance of its camera can be effectively prevented. In addition, the adoption of the thickness can result in satisfactory formation of the low-concentration portion. For example, the low-concentration portion is formed within a short time period in the contact of the resin film with a basic solution to be described later. Meanwhile, the thickness of the polarizer is preferably 1.0 µm or more, more preferably 2.0 µm or more.

Examples of the dichromatic substance include iodine and an organic dye. The substances may be used alone or in combination. Of those, iodine is preferably used. The use of iodine can result in satisfactory formation of the low-concentration portion.

The low-concentration portion is a portion having a content of the dichromatic substance lower than that of the other portion. The content of the dichromatic substance of the low-concentration portion is preferably 1.0 wt % or less, more preferably 0.5 wt % or less, still more preferably 0.2 wt % or less. When the content of the dichromatic substance in the low-concentration portion falls within such range, desired transparency can be imparted to the low-concentration portion. When the low-concentration portion is caused to correspond to, for example, the camera hole portion of an image display apparatus, photographing performance that is extremely excellent from both the viewpoints of brightness and a tinge can be realized. Meanwhile, a lower limit for the content of the dichromatic substance in the low-concentration portion is typically equal to or less than a detection limit. It should be noted that when iodine is used as the dichromatic substance, the iodine content of the low-concentration portion is determined from, for example, a calibration curve created in advance from the X-ray intensity of iodine measured by fluorescent X-ray analysis through the use of a standard sample.

A difference between the content of the dichromatic substance in the other portion and the content of the dichromatic substance in the low-concentration portion is preferably 0.5 wt % or more, more preferably 1 wt % or more.

Any appropriate resin may be used as a resin for forming the resin film. A polyvinyl alcohol-based resin (hereinafter referred to as "PVA-based resin") is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may be appropriately selected depending on purposes. The average polymerization degree is typically from 1,000 to 10,000, preferably from 1,200 to 6,000, more preferably from 2,000 to 5,000. It should be noted that the average polymerization degree may be determined in conformity with JIS K 6726-1994.

B. Method of Producing Polarizer

The low-concentration portion is preferably formed by bringing a basic solution into contact with the resin film containing the dichromatic substance.

B-1. Resin Film Containing Dichromatic Substance

The resin film containing the dichromatic substance can be typically obtained by subjecting a resin film (a resin layer formed on a substrate is also permitted) to any one of various treatments, such as a dyeing treatment, a stretching treatment, a swelling treatment, a cross-linking treatment, a washing treatment, and a drying treatment.

In one embodiment, the resin film containing the dichromatic substance is produced by a method involving: forming a resin layer containing the PVA-based resin on a substrate to provide a laminate; dyeing the resin layer with a dyeing liquid containing iodine; and subjecting the laminate to underwater stretching in an aqueous solution of boric acid.

With such method, a polarizer that can satisfy the thickness and the optical characteristics (the single axis transmittance and the polarization degree) can be satisfactorily obtained.

The thickness of the substrate is preferably from 20 μm to 300 μm, more preferably from 50 μm to 200 μm. As the materials for forming the substrate, there are given, for example, an ester-based resin, such as a polyethylene terephthalate-based resin, a cycloolefin-based resin, an olefin-based resin, such as polypropylene, a (meth)acrylic resin, a polyamide-based resin, a polycarbonate-based resin, and a copolymer resin thereof. Of those, a polyethylene terephthalate-based resin is preferably used. In particular, an amorphous polyethylene terephthalate-based resin is preferably used. Specific examples of the amorphous polyethylene terephthalate-based resin include: a copolymer further containing isophthalic acid as a dicarboxylic acid; and a copolymer further containing cyclohexanedimethanol as a glycol. It should be noted that the substrate can be directly utilized as a protective film.

The thickness of the resin layer is preferably from 3 μm to 40 μm, more preferably from 3 μm to 20 μm, still more preferably from 3 μm to 15 μm. The resin layer is, for example, an applied layer formed by applying an application liquid containing the PVA-based resin onto the substrate, and drying the liquid. The application liquid is typically a solution prepared by dissolving the PVA-based resin in a solvent. Water is preferably used as the solvent. The PVA-based resin concentration of the solution is preferably from 3 parts by weight to 20 parts by weight with respect to 100 parts by weight of the solvent.

The dyeing liquid is preferably an aqueous solution of iodine. The compounding amount of iodine is preferably from 0.1 part by weight to 0.5 part by weight with respect to 100 parts by weight of water. The aqueous solution of iodine is preferably compounded with an iodide (e.g., potassium iodide) in order that the solubility of iodine in water may be increased. The compounding amount of the iodide is preferably from 0.1 part by weight to 20 parts by weight, more preferably from 0.5 part by weight to 10 parts by weight with respect to 100 parts by weight of water.

The resin layer is typically dyed by immersing the laminate in the dyeing solution. The liquid temperature of the dyeing liquid is preferably from 20° C. to 50° C. An immersion time is preferably from 5 seconds to 5 minutes. It should be noted that the dyeing conditions (the concentration, the liquid temperature, and the immersion time) may be set so that the polarization degree or single axis transmittance of the polarizer to be finally obtained may fall within a predetermined range.

The aqueous solution of boric acid is preferably obtained by dissolving boric acid and/or a borate in water as a solvent. The concentration of boric acid is preferably from 1 part by weight to 10 parts by weight with respect to 100 parts by weight of water. When the concentration of boric acid is set to 1 part by weight or more, the dissolution of the resin layer can be effectively suppressed.

The aqueous solution of boric acid is preferably compounded with an iodide. This is because the elution of iodine can be suppressed when the resin layer is dyed in advance. The concentration of the iodide is preferably from 0.05 part by weight to 15 parts by weight, more preferably from 0.5 part by weight to 8 parts by weight with respect to 100 parts by weight of water.

The underwater stretching is typically performed while the laminate is immersed in the aqueous solution of boric acid. The liquid temperature of the aqueous solution of boric acid at the time of the stretching is preferably from 40° C. to 85° C., more preferably from 50° C. to 85° C. The time period for which the laminate is immersed in the aqueous solution of boric acid is preferably from 15 seconds to 5 minutes. The stretching ratio of the laminate by the underwater stretching is preferably 2.0 times or more. Any appropriate method may be adopted as a method of stretching the laminate. The stretching of the laminate may be performed in one stage, or may be performed in a plurality of stages. In addition, the underwater stretching may be combined with in-air stretching. The laminate is stretched at a stretching ratio of preferably 4.0 times or more, more preferably 5.0 times or more with respect to its original length.

B-2. Contact of Basic Solution

As described above, the low-concentration portion is preferably formed by bringing the basic solution into contact with the resin film containing the dichromatic substance. When iodine is used as the dichromatic substance, the contact of the basic solution with a desired portion of the resin film can easily reduce the iodine content of the contact portion. Specifically, the contact can cause the basic solution to permeate into the resin film. An iodine complex in the resin film is reduced by a base in the basic solution to become an iodine ion. The reduction of the iodine complex to the iodine ion can increase the transmittance of the contact portion. Then, iodine that has become the iodine ion moves from the resin film into the solvent of the basic solution. The transparency of the low-concentration portion thus obtained can be satisfactorily maintained. Specifically, when the transmittance is increased by breaking the iodine complex, iodine remaining in the resin film may form the iodine complex again in association with the use of the polarizer to reduce the transmittance, but when the iodine content is reduced, such problem is prevented.

Any appropriate method may be adopted as a method of bringing the basic solution into contact with the resin film. Examples thereof include: a method involving dropping, applying, or spraying the basic solution onto the resin film; and a method involving immersing the resin film in the basic solution. Upon contact, of the basic solution, the resin film may be protected with any appropriate means (such as a protective film or a surface protective film) so that the basic solution may not contact with a portion except the desired portion (so that the concentration of the dichromatic substance may not reduce).

Any appropriate basic compound may be used as a basic compound in the basic solution. Examples of the basic compound include: hydroxides of alkali metals, such as sodium hydroxide, potassium hydroxide, and lithium hydroxide; hydroxides of alkaline earth metals, such as calcium hydroxide; inorganic alkali metal salts, such as sodium carbonate; organic alkali metal salts, such as sodium acetate; and ammonia water. Of those, hydroxides of alkali metals are preferred, sodium hydroxide, potassium hydroxide, and lithium hydroxide are more preferred, and sodium hydroxide is particularly preferred. The use of the basic solution containing a hydroxide of an alkali metal can efficiently ionize the iodine complex, and hence can form the low-concentration portion with additional ease. Those basic compounds may be used alone or in combination.

Any appropriate solvent may be used as the solvent of the basic solution. Specific examples thereof include: water; alcohols, such as ethanol and methanol; ethers; benzene; chloroform; and a mixed solvent thereof. Of those, water or an alcohol is preferably used because the iodine ion can satisfactorily migrate to the solvent.

The concentration of the basic solution is, for example, from 0.01 N to 5 N, preferably from 0.05 N to 3 N, more preferably from 0.1 N to 2.5 N. When the concentration of the basic solution falls within such range, the low-concentration portion can be efficiently formed. When the basic solution is an aqueous solution of sodium hydroxide, the concentration is preferably 1.0 wt % or more, more preferably from 2 wt % to 8 wt %.

The liquid temperature of the basic solution is, for example, 20° C. or more, preferably from 25° C. to 50° C. When the basic solution is brought into contact with the resin film at such temperature, the low-concentration portion can be efficiently formed.

The time period for which the basic solution is brought into contact with the resin film is set in accordance with, for example, the thickness of the resin film, and the kind and concentration of the basic compound in the basic solution. The contact time is, for example, from 5 seconds to 30 minutes, preferably from 5 seconds to 5 minutes.

As described above, upon contact of the basic solution, the resin film may be protected so that the basic solution may not contact with a portion except the desired portion. The protective film can be directly utilized as a protective film for the polarizer. The surface protective film is temporarily used at the time of the production of the polarizer. The surface protective film is typically bonded to the resin film through a pressure-sensitive adhesive layer because the surface protective film is removed from the polarizer at any appropriate timing.

The polarizer of the illustrated example is produced by, for example, bonding a surface protective film having formed therein a through-hole having a small circular shape to the resin film containing the dichromatic substance, and bringing the basic solution into contact with the resultant. At that time, the other side of the resin film (the side on which the surface protective film is not arranged) is also preferably protected.

B-3. Others

In one embodiment, the basic solution is removed from the resin film by any appropriate means after its contact with the resin film. According to such embodiment, for example, a reduction in transmittance of the low-concentration portion in association with the use of the polarizer can be prevented with additional reliability. A method of removing the basic solution is specifically, for example, washing, removal by wiping with waste or the like, suction removal, natural drying, heat drying, blow drying, or drying under reduced pressure. The basic solution is preferably washed off. A solution to be used in the washing is, for example, water (pure water), an alcohol, such as methanol or ethanol, an acidic aqueous solution, or a mixed solvent thereof. Of those, water is preferably used. The number of times of the washing is not particularly limited, and the washing may be performed a plurality of times. When the basic solution is removed by drying, the temperature at which the solution is dried is, for example, from 20° C. to 100° C.

An acidic solution is preferably brought into contact with the portion of the resin film with which the basic solution has been brought into contact. The contact of the acidic solution with the film can remove the basic solution remaining in the low-concentration portion to an additionally satisfactory level. In addition, the contact can improve the dimensional stability (durability) of the low-concentration portion. The contact with the acidic solution may be performed after the removal of the basic solution, or may be performed without the removal of the basic solution.

Any appropriate acidic compound may be used as an acidic compound in the acidic solution. Examples of the acidic compound include: inorganic acids, such as hydrochloric acid, sulfuric acid, nitric acid, and hydrogen fluoride; and organic acids, such as formic acid, oxalic acid, citric acid, acetic acid, and benzoic acid. Of those, an inorganic acid is preferred as the acidic compound in the acidic solution, and hydrochloric acid, sulfuric acid, or nitric acid is more preferred. Those acidic compounds may be used alone or in combination.

Any one of the solvents listed as the examples of the solvent, of the basic solution may be used as the solvent of the acidic solution. The concentration of the acidic solution is, for example, from 0.01 N to 5 N, preferably from 0.05 N to 3 N, more preferably from 0.1 N to 2.5 N.

The liquid temperature of the acidic solution is, for example, from 20° C. to 50° C. The time period for which the acidic solution is brought into contact with the portion is, for example, from 5 seconds to 5 minutes. It should be noted that the same method as the method of bringing the basic solution into contact with the resin film can be adopted as a method of bringing the acidic solution into contact with the portion. In addition, the acidic solution can be removed from the resin film. The same method as the method of removing the basic solution can be adopted as a method of removing the acidic solution.

C. Polarizing Plate

A polarizing plate of the present invention includes the polarizer. The polarizing plate typically includes the polarizer and a protective film arranged on at least one side of the polarizer. As the materials for forming the protective film, there are given, for example, a cellulose-based resin, such as diacetyl cellulose or triacetyl cellulose, a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof.

The surface of the protective film on which the polarizer is not laminated may have formed thereon a hard coat layer serving as a surface-treated layer, or may be subjected to an antireflection treatment or a treatment intended for diffusion or for glare prevention. The surface-treated layer is preferably, for example, a layer having a low moisture permeability for the purpose of improving the humidification durability of the polarizer. A hard coat treatment is performed for the purpose of, for example, preventing the surface of the polarizing plate from being flawed. The hard coat layer can be formed by, for example, a system involving adding, to the surface, a cured coating film based on an appropriate UV-curable resin, such as an acrylic UV-curable resin or a silicone-based UV-curable resin, the cured coating film being excellent in hardness, sliding characteristic, and the like. The hard coat layer preferably has a pencil hardness of 2H or more. The antireflection treatment is performed for the purpose of preventing the reflection of ambient light on the surface of the polarizing plate, and can be achieved by the formation of a low-reflection layer of a type in conformity with a conventional one, such as a thin-layer type disclosed in Japanese Patent Application Laid-open No. 2005-248173 that prevents the reflection through the utilization of a reflected light-canceling effect exhibited by an optical interferential action or a structure type disclosed in Japanese Patent Application Laid-open No. 2011-2759 that provides the surface with a fine structure to express a low reflectance. An antiglare treatment is performed for the purpose of, for example, preventing the inhibition of the viewing of light transmitted through the polarizing plate due to the reflection of the ambient light on the surface of the polarizing plate, and is performed by, for example, providing the surface of the protective film with a fine uneven structure according to an appropriate system, such as a surface-roughening system based on a sandblast system or an embossing system, or a system involving compounding transparent fine particles. An antiglare layer may also serve as a diffusion layer (e.g., a viewing angle-broadening function) for diffusing the light transmitted through the polarizing plate to broaden a viewing angle or the like.

The thickness of the protective film is preferably from 10 μm to 100 μm. The protective film is typically laminated on the polarizer through intermediation of an adhesion layer (specifically an adhesive layer or a pressure-sensitive adhesive layer). The adhesive layer is typically formed of a PVA-based adhesive or an active energy ray-curable adhesive. The pressure-sensitive adhesive layer is typically formed of an acrylic pressure-sensitive adhesive.

D. Image Display Apparatus

An image display apparatus of the present invention includes the polarizing plate. Examples of the image display apparatus include a liquid crystal display apparatus and an organic EL device. Specifically, the liquid crystal display apparatus includes a liquid crystal panel including: a liquid crystal cell; and the polarizing plate arranged on one side, or each of both sides, of the liquid crystal cell. The organic EL device includes an organic EL panel including the polarizing plate arranged on a viewer side. The polarizing plate is typically arranged so that its low-concentration portion may correspond to the camera hole portion of an image display apparatus on which the polarizing plate is mounted.

EXAMPLES

Now, the present invention is specifically described by way of Examples. However, the present invention is not limited to these Examples. It should be noted that, methods of measuring respective characteristics are as described below.

1. Thickness

Measurement was performed with a digital micrometer (manufactured by Anritsu Corporation, product name: "KC-351C").

2. Polarization Degree

The single axis transmittance (Ts), parallel transmittance (Tp), and cross transmittance (Tc) of a polarizer were measured with a UV-visible spectrophotometer (manufactured by JASCO Corporation, product name: "V-7100"), and its polarization degree (P) was determined from the following equation. It should be noted that the Ts, the Tp, and the Tc are Y values measured with the two-degree field of view (C light source) of JIS Z 8701 and subjected to visibility correction.

$$\text{Polarization degree } (P) \, (\%) = \{(Tp-Tc)/(Tp+Tc)\}^{1/2} \times 100$$

Example 1

(Production of Laminate)

An amorphous isophthalic acid-copolymerized polyethylene terephthalate (IPA-copolymerized PET) film having an elongated shape and having a coefficient of water absorption of 0.75% and a Tg of 75° C. (thickness: 100 μm) was used as a resin substrate.

One surface of the resin substrate was subjected to a corona treatment. An aqueous solution containing polyvinyl alcohol (polymerization degree: 4,200, saponification degree: 95.2 mol %) and acetoacetyl-modified. PVA (polymerization degree: 1,200, acetoacetyl modification degree: 4.6%, saponification degree: 99.0 mol % or more, manufactured by The Nippon Synthetic Chemical Industry Co., Ltd., trade name: "GOHSEFIMER Z-200") at a ratio of 9:1 was applied to the corona-treated surface at 25° C. and dried to form a PVA-based resin layer having a thickness of 11 μm. Thus, a laminate was produced.

(Production of Polarizing Plate)

The resultant laminate was subjected to free-end uniaxial stretching at a stretching ratio of 2.0 times in its longitudinal direction (lengthwise direction) between rolls having different peripheral speeds in an oven at 120° C. (preliminary in-air stretching).

Next, the laminate was immersed in an insolubilizing bath having a liquid temperature of 30° C. (aqueous solution of boric acid obtained by compounding 100 parts by weight of water with 4 parts by weight of boric acid) for 30 seconds (insolubilizing treatment).

Next, the laminate was immersed in a dyeing bath having a liquid temperature of 30° C. while its iodine concentration and an immersion time were adjusted so that a polarizing plate to be obtained had a predetermined transmittance. In this example, the laminate was immersed in an aqueous solution of iodine obtained by compounding 100 parts by weight of water with 0.2 part by weight of iodine and 1.5 parts by weight of potassium iodide for 60 seconds (dyeing treatment).

Next, the laminate was immersed in a cross-linking bath having a liquid temperature of 30° C. (aqueous solution of boric acid obtained by compounding 100 parts by weight of water with 3 parts by weight of potassium iodide and 3 parts by weight, of boric acid) for 30 seconds (cross-linking treatment).

After that, the laminate was subjected to uniaxial stretching so as to achieve a total stretching ratio of 5.5 times in the longitudinal direction (lengthwise direction) between rolls having different, peripheral speeds while being immersed in an aqueous solution of boric acid having a liquid temperature of 70° C. (aqueous solution obtained by compounding 100 parts by weight of water with 4 parts by weight of boric acid and 5 parts by weight of potassium iodide) (underwater stretching).

After that, the laminate was immersed in a washing bath having a liquid temperature of 30° C. (aqueous solution obtained by compounding 100 parts by weight of water with 4 parts by weight of potassium iodide) (washing treatment).

After the washing, an aqueous solution of a PVA-based resin (manufactured by The Nippon Synthetic Chemical Industry Co., Ltd., trade name: "GOHSEFIMER (trademark) Z-200", resin concentration: 3 wt %) was applied onto a PVA-based resin layer surface of the laminate, a triacetyl cellulose film (manufactured by Konica Minolta, Inc., trade name: "KC4UY", thickness: 40 μm) was bonded thereto, and the resultant was heated in an oven maintained at 60° C. for 5 minutes. Thus, a polarizing plate including a polarizer having a thickness of 5 μm (single axis transmittance: 42.8%, polarization degree: 99.99%) was produced.

(Formation of Iodine Low-Concentration Portion)

The resin substrate was peeled from the resultant polarizing plate, a surface protective film having formed therein a small circular hole having a diameter of 4 mm was bonded to the peeled surface (polarizer surface), and the resultant was immersed in a 1 mol/L (1 N, 4 wt %) aqueous solution of sodium hydroxide for 8 seconds (alkali treatment). Next, the resultant was immersed in 0.1 N hydrochloric acid for 30 seconds (acid treatment). After that, the resultant was dried at 60° C. and the surface protective film was peeled. Thus, a polarizing plate having an iodine low-concentration portion was obtained. It should be noted that a PET film (thickness: 38 μm, manufactured by Mitsubishi Plastics, Inc., trade name: DIAFOIL) having formed thereon a pressure-sensitive adhesive layer having a thickness of 5 μm was used as the surface protective film.

Example 2

An aqueous solution of polyvinyl alcohol (polymerization degree: 2,400, saponification degree: 99.2 mol %) was applied onto a metal plate and dried at 120° C. for 5 minutes to provide a PVA film having a thickness of 20 μm.

The resultant PVA film was immersed in an aqueous solution at 30° C. for 30 seconds (swelling step).

Next, the PVA film was immersed in a dyeing bath at a liquid temperature of 30° C. while an iodine concentration and an immersion time were adjusted so that a polarizing plate to be obtained had a predetermined transmittance. In this example, the PVA film was immersed in an aqueous iodine solution obtained by compounding 100 parts by weight, of water with 0.15 part, by weight of iodine and 1.0 part, by weight, of potassium iodide for 60 seconds (dyeing treatment).

Next, the PVA film was immersed in a cross-linking bath having a liquid temperature of 30° C. (aqueous solution of boric acid obtained by compounding 100 parts by weight of water with 3 parts by weight of potassium iodide and 3 parts by weight of boric acid) for 30 seconds (cross-linking treatment).

After that, the PVA film was uniaxially stretched in its longitudinal direction (lengthwise direction) at a stretching ratio of 5.5 times between rolls having different peripheral speeds while being immersed in an aqueous solution of boric acid having a liquid temperature of 70° C. (aqueous solution obtained by compounding 100 parts by weight of water with 4 parts by weight of boric acid and 5 parts by weight, of potassium iodide) (underwater stretching).

After that, the PVA film was immersed in a washing bath having a liquid temperature of 30° C. aqueous solution obtained by compounding 100 parts by weight of water with 4 parts by weight of potassium iodide) (washing treatment).

After the washing, an aqueous solution of a PVA-based resin (manufactured by The Nippon Synthetic Chemical Industry Co., Ltd., trade name: "GOHSEFIMER (trademark) Z-200", resin concentration: 3 wt %) was applied to one surface of the PVA film, a triacetylcellulose film (manufactured by Konica Minolta, Inc., trade name: "KC4UY", thickness: 40 μm) was bonded thereto, and the resultant, was heated in an oven maintained at 60° C. for 5 minutes. Thus, a polarizing plate including a polarizer having a thickness of 7 μm (single axis transmittance: 42.5%, polarization degree: 99.99%) was produced.

The surface protective film was bonded to the polarizer surface of the resultant polarizing plate, and the resultant was immersed in a 1 mol/L (1 N) aqueous solution of sodium hydroxide for 10 seconds. Next, the resultant was immersed in 0.1 N hydrochloric acid for 30 seconds. After that, the resultant was dried at 60° C. and the surface protective film was peeled. Thus, a polarizing plate having an iodine low-concentration portion was obtained.

Example 3

A polarizing plate including a polarizer having a thickness of 12 μm (single axis transmittance: 42.5%, polarization degree: 99.99%) was produced in the same manner as in Example 2 except that: a PVA film having a thickness of 30 μm (PE3000 manufactured by Kuraray Co., Ltd.) was used; and the iodine concentration and potassium iodide concentration of the dyeing bath were changed to 0.1 wt % and 1.0 wt %, respectively.

The surface protective film was bonded to the polarizer surface of the resultant polarizing plate, and the resultant was immersed in a 1 mol/L (1 N) aqueous solution of sodium hydroxide for 25 seconds. Next, the resultant was immersed in 0.1 N hydrochloric acid for 30 seconds. After that, the resultant was dried at 60° C. and the surface protective film was peeled. Thus, a polarizing plate having an iodine low-concentration portion was obtained.

Comparative Example 1

A polarizing plate including a polarizer having a thickness of 23 μm (single axis transmittance: 42.8%, polarization degree: 99.99%) was produced in the same manner as in Example 2 except that a PVA film having a thickness of 60 μm (PE6000 manufactured by Kuraray Co., Ltd.) was used.

The surface protective film was bonded to the polarizer surface of the resultant polarizing plate, and the resultant was immersed in a 1 mol/L (1 N) aqueous solution of sodium hydroxide for 80 seconds. Next, the resultant, was immersed in 0.1 N hydrochloric acid for 30 seconds. After that, the resultant was dried at 60° C. and the surface protective film was peeled. Thus, a polarizing plate having an iodine low-concentration portion was obtained.

Comparative Example 2

A polarizing plate having an iodine low-concentration portion was obtained in the same manner as in Comparative Example 1 except, that the time of the immersion in the aqueous solution of sodium hydroxide in the alkali treatment was changed to 40 seconds.

The resultant polarizing plates were each subjected to the following evaluations.
1. Iodine Content of Polarizer The iodine content of a portion corresponding to the small hole of the surface protective film was measured. Specifically, the content of each element was determined from a calibration curve created in advance from the X-ray intensity of the element measured by fluorescent X-ray analysis under the following conditions through the use of a standard sample.
Analysis apparatus: manufactured by Rigaku Corporation, X-ray fluorescence (XRF) analysis apparatus, product name "ZSX100e"
Anticathode: rhodium
Dispersive crystal: lithium fluoride
Excitation light energy: 40 kV-90 mA
Iodine measured line: I-LA
Quantification method: FP method
2θ angle peak: 103.078 deg (iodine)
Measurement time: 40 seconds
2. Transmittance The transmittance of the iodine low-concentration portion was measured with a UV-visible spectrophotometer (manufactured by JASCO Corporation, product name: "V-7100"). It should be noted that in each of Examples and Comparative Examples, a sample in which the diameter of the small hole of the surface protective film was changed to 20 mm was separately produced, and the sample was subjected to the measurement.

3. External Appearance

The external appearance of the iodine low-concentration portion (portion corresponding to the small hole of the surface protective film) was observed visually and with an optical microscope (MX61 manufactured by Olympus Corporation, magnification: 5), The results of the evaluations are shown in Table 1 together with the iodine contents of Example 1 and Comparative Example 1 before the alkali treatments. In addition, photographs obtained by the observation with the optical microscope are shown in FIG. 2A to FIG. 2D.

TABLE 1

|  | Thickness of polarizer | Alkali treatment | Iodine content | Transmittance | External appearance (visual observation) | External appearance (microscope) |
|---|---|---|---|---|---|---|
| Example 1 | 5 μm | 8 seconds | <1 w % | 91.0% | Satisfactory | Satisfactory |
| Example 2 | 7 μm | 10 seconds | <1 w % | 91.0% | Satisfactory | Satisfactory |
| Example 3 | 12 μm | 25 seconds | <1 w % | 91.0% | Satisfactory | Wrinkle |
| Comparative Example 1 | 23 μm | 80 seconds | <1 w % | 91.0% | Wrinkle | Wrinkle |
| Comparative Example 2 | 23 μm | 40 seconds | 2 w % | 48.0% | Satisfactory | Satisfactory |
| (Reference) | 5 μm | — | 8 w % | — | — | — |
| (Reference) | 23 μm | — | 2.5 w % | — | — | — |

In the visual observation, while no wrinkle was observed in the iodine low-concentration portion in each of Examples, a wrinkle was clearly observed in Comparative Example 1. In Example 3, a wrinkle was observed in the observation with the optical microscope. A wrinkle was formed so as to be substantially parallel to the absorption axis direction of a polarizer. A wrinkle occurs after the alkali treatment (before the acid treatment), and hence it is assumed that the wrinkle is caused by the following procedure: water is partially absorbed from a portion with which the basic solution is brought into contact, and the portion is swollen by a subsequent treatment. It should be noted that when a film, such as a protective film, is bonded to a polarizer in which a wrinkle has occurred, there is a risk in that air bubbles are liable to occur locally and hence required quality cannot be satisfied. It should be noted that in Comparative Example 2, no wrinkle was observed in the iodine low-concentration portion, but a high transmittance was not obtained.

Figure 3B:
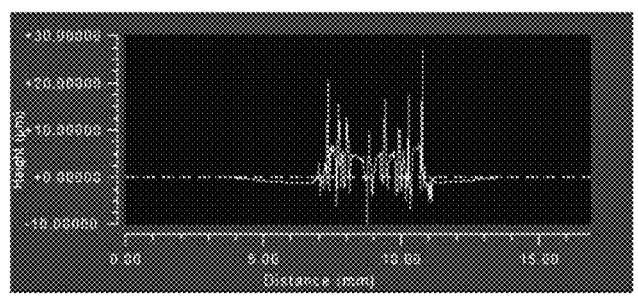

The results of the evaluations of Example 1 and Comparative Example 1 for surface smoothness (the size of unevenness) near the iodine low-concentration portions with an optical measuring instrument "ZYGO New View 7300" manufactured by Canon Inc. are shown in FIG. 3A and FIG. 3B. It is understood well from FIG. 3B that unevenness (a wrinkle) is formed in the iodine low-concentration portion in Comparative Example 1.

The polarizer of the present invention is suitably used for a camera-equipped image display apparatus (a liquid crystal display apparatus and an organic EL device) of a mobile phone, such as a smart, phone, a notebook PC, a tablet PC, or the like.

Many other modifications will be apparent to and be readily practiced by those skilled in the art without departing from the scope and spirit of the invention. It should therefore be understood that the scope of the appended claims is not intended to be limited to the details of the description but should rather be broadly construed.

What is claimed is:

1. A polarizer, comprising a resin film having a thickness of 13 μm or less and containing iodine, wherein the resin film has formed therein a portion having a content of the iodine lower than that of another portion, and wherein the content of the iodine in the portion having a content of the iodine lower than that of another portion is 1.0 wt % or less.

2. The polarizer according to claim 1, wherein the polarizer has a single axis transmittance of 42.0% or more and a polarization degree of 99.95% or more in the another portion.

3. The polarizer according to claim 1, wherein the portion having a content of the iodine lower than that of another portion has a transmittance of 50% or more.

4. The polarizer according to claim 1, wherein the portion having a content of the iodine lower than that of another portion has a substantially circular shape having a diameter of 10 mm or less.

5. The polarizer according to claim 1, wherein the thickness of the resin film is 8 μm or less.

6. The polarizer according to claim 1, wherein the portion having a content of the iodine lower than that of another portion corresponds to a camera hole portion of an image display apparatus on which the polarizer is mounted.

7. The polarizer according to claim 1, wherein the portion having a content of the iodine lower than that of another portion is formed by bringing a basic solution into contact with the resin film containing the iodine.

8. The polarizer according to claim 7, wherein the basic solution comprises an aqueous solution of sodium hydroxide having a concentration of 1 wt % or more.

9. A polarizing plate, comprising the polarizer of claim 1.

10. An image display apparatus, comprising the polarizing plate of claim 9.

11. A method of producing the polarizer of claim 1, the method comprising bringing a basic solution into contact with a resin film having a thickness of 13 μm or less and containing iodine.

12. The production method according to claim 11, wherein the basic solution has a temperature of 20° C. or more.

13. The production method according to claim 11, further comprising bringing an acidic solution into contact with a portion of the resin film with which the basic solution has been brought into contact.

14. The production method according to claim 11, wherein the resin film comprises a resin layer formed on a substrate.

15. The production method according to claim 14, wherein the resin layer comprises an applied layer.

* * * * *